Oct. 21, 1952 J. J. MEEHAN 2,614,938
METHOD FOR SELECTIVE STERILIZATION OF FOOD PRODUCTS
Filed Aug. 19, 1949
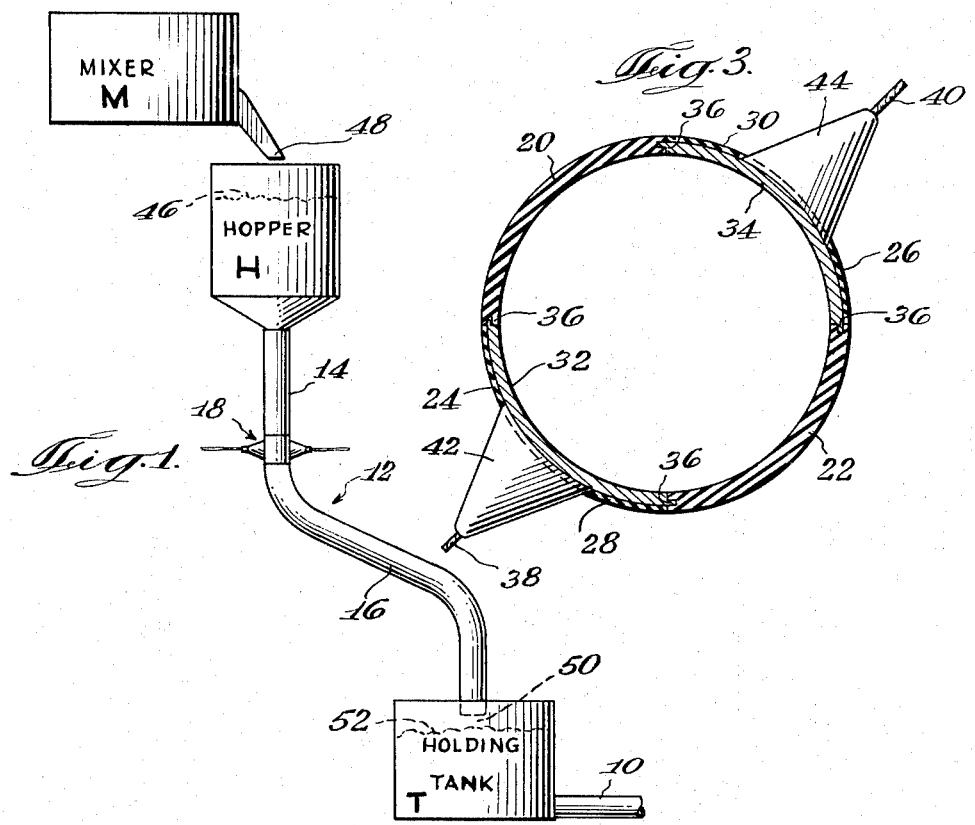
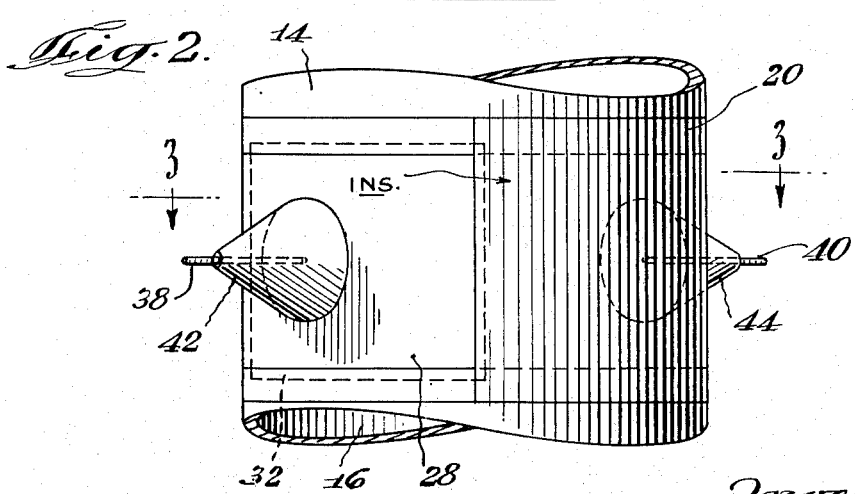
Inventor
John J. Meehan
By Eli Mullin
Attorney Patented Oct. 21, 1952

2,614,938

UNITED STATES PATENT OFFICE 2,614,938

METHOD FOR SELECTIVE STERILIZATION OF FOOD PRODUCTS

John J. Meehan, Chicago, Ill.

Application August 19, 1949, Serial No. 111,309

9 Claims. (Cl. 99—221)

This invention relates to an improved method and apparatus for treating food products to improve their preservative qualities by selective inactivation of undesirable food contaminants such as yeast, certain bacteria, insects and related deleterious contaminants usually found in various food products. More particularly, this invention relates to a method and apparatus for selective sterilization of foods by electric shock treatment with a high potential current.

It is well known that certain foods and related products often contain contaminants and extraneous matter such as yeast, bacteria, molds, insects, larvae and the like, some of which are objectionable, and some of which are desirable for various reasons. Some contaminants such as certain bacteria are essential for maintaining such qualities as taste, appearance and the like. On the other hand, some of the contaminants are particularly objectionable not only because of hygienic reasons, but also because they directly affect the preservative qualities of the product through bacterial or other decomposition.

Recognizing the undesirability of the presence of such contaminants, attempts have been made to subject the foods to various sterilization processes, some of which have even utilized high frequency currents. Heretofore, however, all of these methods have failed because they were unable to afford truly selective sterilization so that desirable as well as objectionable contaminants were destroyed. Moreover, these processes have usually relied upon electrical heating rather than shock; such heating often negatively affecting the taste or other characteristics of the product.

It is, therefore, an important object of this invention to provide a process or method and apparatus for selective sterilization of food products by means of electric shock induced by a low amperage-high voltage current for the purpose of markedly increasing the preservative or "keeping" quality of the product.

Another object of this invention is to afford a method and apparatus for selective sterilization of food products by high potential electrical energy without materially heating the product.

Still another object is to afford a selective sterilization process which may be conducted during or shortly after the usual food preparation processes without interfering with or retarding the same. An object relating thereto is to afford a process in which sterilization is accomplished in but a few seconds time.

Another related object is to provide an apparatus for performing the process continuously on a food product during or shortly after its preparation.

Still another related object is to afford an apparatus for performing the selective sterilization process on a food product while in a bulk state prior to packing or packaging.

And yet another related object is to provide a selective sterilization method which may be readily performed on packages as well as bulk food products.

Heretofore the apparatus employed for conducting sterilization processes, especially those utilizing high frequency electrical current, have been characterized by their involved and complicated structures. Some of the processes did not conduct the current directly through the food product, but instead generated a corona which was employed as the sterilizing agent. Such apparatus was extremely complicated in structure.

It is, therefore, another important object to provide a method and apparatus for selective sterilization of food products by direct treatment with high potential electric current in an extremely simple, yet effective, apparatus.

A related object is to afford a selective sterilization apparatus which does not necessitate the insertion of electrodes and the like directly into the food product being treated.

And yet a further object is the provision of a method and apparatus for selective sterilization of food products by non-heating high potential direct current which may be converted and rectified from standard 110 volt alternating current.

For the purpose of facilitating an understanding of my invention I have illustrated in the accompanying drawings a preferred embodiment thereof together with diagrams, from an inspection of which, when considered in connection with the following description together with my discussion thereof, should result in an understanding of the manner of practicing the methods of this invention, the construction, assembly and use of the invention and an appreciation of the many advantages inherent therein.

Referring to the drawings in which the same characters of reference are employed to indicate corresponding or similar parts throughout the several figures of the drawings:

Fig. 1 is a diagrammatic view of a portion of a food product preparation system containing an apparatus embodying the principles of the present invention;

Fig. 2 is an enlarged elevational view of a section of the food conveyer tube shown in Fig. 1 with the coupling sleeve sterilizing apparatus comprising the present invention mounted therein; and Fig. 3 is a sectional view taken on the plane of line 3—3 in Fig. 2 and viewed in the direction indicated.

The embodiment of the invention chosen for illustration in the drawings comprises an apparatus for practicing the process of selective sterilization on a food product in its bulk form during the preparation thereof. Thus, in Fig. 1 is illustrated in diagrammatic form, processing equipment such as is used in the preparation and packaging of food products such as salad dressings, sandwich spreads, cheese products and the like.

This equipment includes a mixer tank M, a hopper H, a holding tank T directly connected by a tube 10 to a filling machine (not shown in the drawings). The hopper and holding tank are operationally connected by a conveying tube indicated generally by reference numeral 12 which may comprise an upper and lower section 14 and 16. Connecting these two sections 14 and 16 a coupling sleeve indicated generally by the reference numeral 18 may be interposed. It is this connecting sleeve 18 which contains the electrical apparatus comprising this invention.

As the food product is conveyed by gravity through the tube 12 it passes through the coupling sleeve 18 and is subjected at that point to a high potential-low ampere current which is the basic sterilizing agent of this invention. This current is conducted directly through the stream of material and immediately affects the contaminants such as yeast spores, certain bacteria, insects and similar deleterious organisms and bacteriological bodies. The bacteria are selectively affected according to their individual sensitivity. The yeast spores are not necessarily completely eliminated from the food product, but are definitely reduced to a dormant, inactive state which in turn increases several fold the perservative or "keeping" quality of the food.

The duration of the treatment is directly related to the width or height of the sleeve 18, but in any event need not exceed five seconds' time. The material to be treated must be capable of conducting a current therethrough and, therefore, must contain an ingredient which may serve as an electrolyte. The temperature of the food product is immaterial, the only limitation being that its liquid content not be in a solid or frozen state. During the application of the current little or no rise in temperature of the product is induced.

The potential necessary for effective sterilization depends directly upon the resistance of the substance. This in turn may be affected by its physical condition such as temperature, fluid content and the like. In any event it has been found that the potential may vary from 30 kv. to 1,000 kv., and the amount of current may vary from 3 to 30 milli-amps.

Although the explanation of this process is not fully known theoretically it is believed the high potential current charges the individual spores and bodies positively and negatively respectively at their ends, setting up a high potential field inducing shock in each body sufficient to inactivate for considerable periods of time the spore or body thus effected. Certain contaminants such as molds, certain fungi, and certain bacteria are not affected by the current and, therefore, remain in their active state in the food product. However, it has been found that these particular contaminants are ordinarily desirable in maintaining certain characteristics and qualities of the food product.

The above described theoretical explanation is believed to be applicable particularly to the process as practiced with A. C. current. When D. C. current is utilized it is believed that a somewhat different reaction may take place. This reaction is basically electro-chemical in nature resulting in organism-inactivation due to starvation. Specifically the starvation occurs because of the electrolytic precipitation of particles from the cytoplasm between the nucleus and the cell wall of the micro-organism. This colloidal suspension contains the food necessary for survival and reproduction of the organism cells. Hence the precipitation of such particles deprives the cell of its food source and thereby inactivates it.

Turning now to a more detailed description of the coupling sleeve 18 which embodies the apparatus, it will be seen from an examination of Figs. 2 and 3 of the drawings that the sleeve is essentially of the same form and size as that of the tube 12. It may be interposed directly between the tube sections 14 and 16 and is comprised of four arcuate segments. Two of these segments 20 and 22, positioned opposite each other, are constructed of an insulating material. The other two segments 24 and 26 are connected respectively to the ends of segments 20 and 22 and are formed with outer insulating layers 28 and 30 and with inner electrodes 32 and 34 directly adjacent said outer insulating layers. These electrodes 32 and 34 may be made of any suitable material such as copper, and removably affixed to the ends of the insulating segments 20 and 22 as by tongue and groove joints such as 36. The electrodes 32 and 34 are charged from a power source by means of cables 38 and 40. Insulation cones 42 and 44 may be positioned about the base of cables 38 and 40 and adjacent insulating segments 28 and 30 to prevent sparking and arcing of the current at this point.

The power source may be a common 110 volt alternating current outlet. This current may be transformed to high voltage, low ampere A. C. current, and then rectified by an ordinary rectifier (not shown in the drawings) to high potential-low ampere D. C. current. Although A. C. current may possibly be substituted for the D. C. current I prefer to use the latter as it is easier to handle and is more readily conducted through the material being sterilized. Furthermore, the probability of corona discharge is considerably less and may be better controlled with the use of D. C. current than with A. C. current.

In addition to the direct action of the electric current upon the material as it passes through the coupling sleeve 18, indirect treatment is effected by the charged material both above and below the sleeve. This electrical charge is inversely proportional in intensity to the distance from the electrodes 32 and 34, but at any rate is insufficient to jump the gap between the material 46 in the hopper H, and the bottom of mixer spout 48. Similarly the gap 50 between the bottom of tube 16 and the top of the material 52 in holding tank T is sufficient to insulate said material in the tank T from that in the tube 16. Hence, the sterilization action is entirely confined to the material in the conveying tube 12.

Although the embodiment chosen for illustration in the drawings is particularly adapted for treating bulk food product material, simple apparatus may readily be devised to practice this method on packaged or bottled food products. In such apparatus the electrodes may be placed at the top and bottom of the containers or one of the electrodes may be placed directly in or upon the surface of the food product in the container.

It should be obvious from the above description that I have provided a process and simple apparatus for selectively sterilizing a large variety of food products by passing a high potential current therethrough for the purpose of inducing shock in certain contaminating organisms and bodies; thereby inactivating such contaminants. This inactivation in turn prevents bacteriological and other decomposition and thereby increases the "keeping quality" of the food product. This process is conducted without heating of the product, which might affect the taste, appearance and other desirable qualities of the food. The process may be conducted continuously without interfering or slowing down the preparation or packaging process. Finally, the apparatus necessary for practicing the process is extremely simple, but most effective.

While I have set forth certain theoretical explanations of the process I do not wish to be limited by such theories, since the results obtained may or may not be explained thereby. Such explanation has been included only with the view that the specification may be made clear and more complete. It is my desire to secure the invention as pointed out in the appended claims regardless of the theory upon which it is based. It is believed that my invention in all of its phases has been clearly set forth herein such that the practicing of the method and construction of the device should be readily understood without further description, and it should be manifest that the details of the method and of the construction of the apparatus described are capable of wide variation within the purview of the invention as described in the appended claims.

What I claim and desire to secure by Letters Patent of the United States is:

1. The method of preserving food products by selective sterilization which includes, in the order stated, the steps of preparing the food, conveying the food through a tube, and subjecting said food to a high voltage-low ampere current while simultaneously maintaining the food product in a substantially constant unheated condition, said current characterized by a voltage of at least 30,000 volts and an amperage not exceeding 30 milli-amps.

2. The method of preserving food products by selective sterilization which includes, in the order stated, the steps of preparing a food product containing an electrolyte, conveying the product between a pair of electrodes, and passing a high voltage-low ampere current between said electrodes and through the product while simultaneously maintaining the product in a substantially constant unheated condition, said current characterized by a voltage of at least 30,000 volts and an amperage not exceeding 30 milli-amps.

3. The method of inactivating selected contaminants in food products which consists in passing a high potential-low ampere electrical current through the product so as to induce shock in said contaminants, said current characterized by a voltage of at least 30,000 volts and an amperage not exceeding 25 milli-amps.

4. The method of inactivating selected contaminants in food products which consists in passing a high-potential low-ampere current through the product so as to induce shock in said contaminants, said current characterized by a voltage not exceeding 1000 kilo-volts and an amperage of between 5 and 30 milli-amps.

5. The method of inactivating selected contaminants in food products which consists in passing a high-potential low-ampere current through the product so as to induce shock in said contaminants, said current characterized by a voltage of between 30 and 1000 kilo-volts and an amperage of between 3 and 30 milli-amps.

6. The method of in activating selected contaminants in food products which consists in passing for a period not exceeding 5 seconds a high-potential low-ampere current through the product so as to induce shock in said contaminants, said current characterized by a voltage of between 30 and 1000 kilo-volts and an amperage of between 3 and 30 milli-amps.

7. The method of inactivating selected contaminants in food products which consists in passing a high-potential low-ampere direct current through the product so as to induce electrolytic precipitation in the cytoplasm of the contaminant organisms, said current characterized by a voltage of at least 30,000 volts and an amperage not exceeding 30 milli-amps.

8. The method of inactivating selected contaminants in food products which consists in passing a high-potential low-ampere direct current through the product so as to induce electrolytic precipitation in the cytoplasm of the contaminant organisms, said current characterized by a voltage not exceeding 1,000 kilo-volts and an amperage of between 3 and 30 milli-amps.

9. The method of inactivating selected contaminant organisms in food products which consists in passing a high-potential low-ampere direct current through the product so as to induce an inactivating electro-chemical action within the organism cell, said current characterized by a voltage of between 30 and 1,000 kilo-volts and an amperage of between 3 and 30 milli-amps.

JOHN J. MEEHAN.

REFERENCES CITED

The following references are of record in the file of this patent:

UNITED STATES PATENTS

| Number | Name | Date |
| --- | --- | --- |
| 918,531 | Goucher | Apr. 20, 1909 |
| 1,147,558 | Shelmerdine | July 20, 1915 |
| 1,522,188 | Hull | Jan. 6, 1925 |
| 1,692,874 | Templeton | Nov. 27, 1928 |
| 1,730,016 | Rudd | Oct. 1, 1929 |
| 1,775,579 | Woodrich | Sept. 9, 1930 |
| 1,863,222 | Hoermann | June 14, 1932 |
| 1,945,867 | Rawls | Feb. 6, 1934 |
| 1,992,515 | Uhlmann | Feb. 26, 1935 |
| 2,098,663 | Juhasz | Nov. 9, 1937 |
| 2,400,951 | Reid | May 28, 1946 |
| 2,474,650 | Birdseye | June 28, 1949 |
| 2,508,365 | Bierwirth | May 23, 1950 |
| 2,510,796 | Brown | June 6, 1950 |